United States Patent
Xiao et al.

(10) Patent No.: US 10,346,602 B2
(45) Date of Patent: Jul. 9, 2019

(54) METHOD AND DEVICE FOR AUTHENTICATING IDENTIFY BY MEANS OF FUSION OF MULTIPLE BIOLOGICAL CHARACTERISTICS

(71) Applicant: GRG BANKING EQUIPMENT CO., LTD., Guangzhou, Guangdong (CN)

(72) Inventors: Zheng Xiao, Guangdong (CN); Jiachun Zheng, Guangdong (CN); Xiaoping Han, Guangdong (CN); Jinjun He, Guangdong (CN)

(73) Assignee: GRG BANKING EQUIPMENT CO., LTD., Guangzhou, Guangdong (CN)

( * ) Notice: Subject to any disclaimer, the term of this patent is extended or adjusted under 35 U.S.C. 154(b) by 0 days.

(21) Appl. No.: 15/765,253

(22) PCT Filed: Mar. 29, 2016

(86) PCT No.: PCT/CN2016/077661
§ 371 (c)(1),
(2) Date: Mar. 31, 2018

(87) PCT Pub. No.: WO2017/067136
PCT Pub. Date: Apr. 27, 2017

(65) Prior Publication Data
US 2018/0285542 A1    Oct. 4, 2018

(30) Foreign Application Priority Data
Oct. 20, 2015   (CN) .......................... 2015 1 0684297

(51) Int. Cl.
*G06F 21/32*    (2013.01)
*H04L 29/06*    (2006.01)
(Continued)

(52) U.S. Cl.
CPC ......... *G06F 21/32* (2013.01); *G06K 9/00892* (2013.01); *G06K 9/629* (2013.01); *G06N 7/005* (2013.01); *H04L 63/0861* (2013.01)

(58) Field of Classification Search
CPC .... G06F 21/32; G06N 7/005; G06K 9/00892; G06K 9/00221; G06K 9/6278; H04L 63/0861
See application file for complete search history.

(56) References Cited

U.S. PATENT DOCUMENTS 5,761,329 A * 6/1998 Chen .................. G06K 9/00892
  382/116
9,082,048 B2 * 7/2015 Miller ................ G06K 9/00892
(Continued)

FOREIGN PATENT DOCUMENTS

CN    1758263 A    4/2006
CN    1794266 A    6/2006
(Continued)

OTHER PUBLICATIONS

Ross et al. Information fusion in biometrics. 2003. Elsevier Science B.V. pp. 2115-2125.*
(Continued)

*Primary Examiner* — Jason K Gee
*Assistant Examiner* — Abdullah Almamun
(74) *Attorney, Agent, or Firm* — Yue (Robert) Xu; Apex Attorneys at Law, LLP

(57) ABSTRACT

Provided are a method and device for authenticating an identity based on fusion of multiple biological characteristics. The method includes: collecting at least two types of biological characteristic identity information of a to-be-identified user; performing characteristic extraction on each type of the collected biological characteristic identify information, to obtain characteristic information corresponding
(Continued)

to the type; establishing characteristic matrixes based on the characteristic information; performing normalization processing on each of the characteristic matrixes; performing dynamic weighting fusion on all of the normalized characteristic matrixes, to obtain a fused characteristic matrix; matching the fused characteristic matrix with a preset standard matrix, to obtain a matching score; and obtaining an identity identification result of the to-be-identified user based on a Bayesian decision model and the matching score.

12 Claims, 4 Drawing Sheets

(51) Int. Cl.
*G06K 9/00* (2006.01)
*G06K 9/62* (2006.01)
*G06N 7/00* (2006.01)

(56) References Cited

U.S. PATENT DOCUMENTS

| | | | |
|---|---|---|---|
| 2006/0120609 A1* | 6/2006 | Ivanov | G06K 9/00711 382/224 |
| 2006/0171571 A1* | 8/2006 | Chan | G06K 9/00885 382/115 |
| 2007/0203904 A1* | 8/2007 | Ren | G06F 17/30271 |
| 2007/0237355 A1* | 10/2007 | Song | G06K 9/00369 382/100 |
| 2008/0252412 A1* | 10/2008 | Larsson | B60R 25/25 340/5.2 |
| 2009/0080731 A1* | 3/2009 | Krishnapuram | G06K 9/6231 382/128 |
| 2009/0171623 A1* | 7/2009 | Kiefer | G06N 99/005 702/181 |
| 2009/0189736 A1* | 7/2009 | Hayashi | G06F 21/32 340/5.81 |
| 2010/0316293 A1* | 12/2010 | Claussen | G06K 9/00288 382/170 |
| 2011/0135165 A1 | 6/2011 | Wechsler et al. | |
| 2011/0211735 A1* | 9/2011 | Langley | G06F 21/32 382/115 |
| 2011/0320930 A1* | 12/2011 | Liang | G07D 7/00 715/234 |
| 2013/0018657 A1 | 1/2013 | Di Mambro et al. | |
| 2013/0223696 A1* | 8/2013 | Azar | G06K 9/00892 382/118 |
| 2014/0016835 A1* | 1/2014 | Song | G10L 17/06 382/118 |
| 2015/0248798 A1* | 9/2015 | Howe | G07C 9/00158 340/5.83 |
| 2017/0024598 A1* | 1/2017 | Chiang | G06K 9/38 |
| 2017/0300744 A1* | 10/2017 | Ju | G06K 9/00 |

FOREIGN PATENT DOCUMENTS

| | | |
|---|---|---|
| CN | 101894254 A | 11/2010 |
| CN | 103745207 A | 4/2014 |
| CN | 105224849 A | 1/2016 |

OTHER PUBLICATIONS

Ho et al. Match Socre Fusion fo Fingerprint and Face Biometrics for Verification. Junal Teknologi. 2015. pp. 93-102.*
International Search Report for PCT/CN2016/077661, dated Jul. 22, 2016, ISA/CN.
The 2nd Office Action regarding Chinese Patent Application No. CN201510684297.2, dated Jun. 8, 2018. English Translation Provided by http://globaldossier.uspto.gov.
The Extended European Search Report dated Jun. 25, 2018.
Wang Zhifang et al: "Feature-Level Fusion of Iris and Face for Personal Identification", May 26, 2009 (May 26, 2009), Medical Image Computing and Computer-Assisted Intervention—MICCAI 2015: 18th International Conference, Munich, Germany, Oct. 5-9, 2015; Proceedings; [Lecture Notes in Computer Science; Lect. Notes Computer], Springer International Publishing, CH.

* cited by examiner

METHOD AND DEVICE FOR AUTHENTICATING IDENTIFY BY MEANS OF FUSION OF MULTIPLE BIOLOGICAL CHARACTERISTICS

This application is a national phase application of PCT international patent application PCT/CN2016/077661, filed on Mar. 29, 2016 which claims priority to the Chinese Patent Application No. 201510684297.2, titled "METHOD AND DEVICE FOR AUTHENTICATING IDENTITY BY MEANS OF FUSION OF MULTIPLE BIOLOGICAL CHARACTERISTICS" and filed with the Chinese State Intellectual Property Office on Oct. 20, 2015, both of which are incorporated herein by reference in their entireties.

FIELD

The present disclosure relates to the field of a financial self-service equipment, and particularly to a method and a device for authenticating an identity based on fusion of multiple biological characteristics.

BACKGROUND

In authentication technology based on fusion of multiple biological characteristics, an identity can be authenticated based on fusion of multiple inherent physiological characteristics. As compared with a conventional identity authentication method, the most important feature of authentication based on biological characteristics is to authenticate the user's own characteristic. The biological characteristic is unique, and is difficult to be impersonated or stolen. In addition, the biological characteristics may be carried with the user and may be used at any time, and also are not required to be maintained regularly. Therefore, an identity authentication system based on biological characteristics authentication technology has attracted more and more attention due to high security, reliability and effectiveness, and is started to be applied into the financial field.

In the conventional technology, an identity of a depositor is generally identified with a single living fingerprint. Since the living fingerprint has exclusiveness, unforgeability, lifelong effectiveness, and carry convenience and other features, an identity of a payee can be authenticated when withdrawing money. In this way, an impersonator can be found in time, and a behavior of stealing money from an account can be prevented, thereby protecting legitimate interests of the bank and the depositor. According to the statistics, high-quality fingerprint information of 5% of the population cannot be collected. Also, technology such as a fingerprint mold which can pass identification of a fingerprint recognition machine occurs in the market with the improvement of science and technology. Requirements for accuracy and security of the identity authentication system are raised increasingly with the increasingly high requirement of the people for security, especially in a particular location such as a bank related to safety of the country and society, and in this case, the authentication technology based on the single biological characteristic cannot meet the actual requirements.

SUMMARY

A method and a device for authenticating an identity based on fusion of multiple biological characteristics are provided according to the embodiments of the present disclosure, to authenticate an identity based on more than two types of biological characteristic identity information, thereby improving an identification accuracy rate.

A method for authenticating an identity based on fusion of multiple biological characteristics is provided according to an embodiment of the present disclosure, which includes: collecting at least two types of biological characteristic identity information of a to-be-identified user; performing characteristic extraction on each type of the at least two types of collected biological characteristic identify information, to obtain characteristic information corresponding to the type of the biological characteristic identify information; establishing characteristic matrixes based on the characteristic information, where there is a one-to-one correspondence among the biological characteristic identity information, the characteristic information and the characteristic matrixes; performing normalization processing on each of the characteristic matrixes; performing dynamic weighting fusion on all of the normalized characteristic matrixes, to obtain a fused characteristic matrix; matching the fused characteristic matrix with a preset standard matrix, to obtain a matching score; and obtaining an identity identification result of the to-be-identified user based on a Bayesian decision model and the matching score.

Optionally, the performing normalization processing on each of the characteristic matrixes includes: performing normalization processing on each of the characteristic matrixes using a MAX-MIN method. Each element in each of the normalized characteristic matrixes ranges from 0 to 1, inclusively.

Optionally, the performing dynamic weighting fusion on all of the normalized characteristic matrixes to obtain a fused characteristic matrix includes: allocating an initial weighting value to each of the normalized characteristic matrixes according to a preset weighting value allocation criteria, where a sum of all of the weighting values is equal to 1; calculating an integrity rate of the characteristic information corresponding to each of the characteristic matrixes; adjusting the weighting value of each of the characteristic matrixes based on the integrity rates while ensuring a sum of all of the weighting values is equal to 1; and performing weighting fusion on all of the normalized characteristic matrixes based on the adjusted weighting values, to obtain the fused characteristic matrix.

Optionally, the adjusting the weighting value of each of the characteristic matrixes based on the integrity rates while ensuring a sum of all of the weighting values is equal to 1 includes: in a case that the integrity rate corresponding to the characteristic matrix is less than 1, proportionally decreasing the weighting value of the characteristic matrix based on a missing rate corresponding to the characteristic matrix, where a sum of the integrity rate and the missing rate is equal to 1; in a case that the integrity rate corresponding to the characteristic matrix is equal to 1, increasing the weighting value of the characteristic matrix corresponding to the integrity rate equal to 1 based on a proportion of the initial weighting value of the characteristic matrix when the weighting value of the characteristic matrix corresponding to the integrity rate less than 1 is decreased proportionally, while ensuring the sum of all of the weighting values is equal to 1; in a case that each of the integrity rates corresponding to the characteristic matrixes is less than 1, regarding the characteristic matrix corresponding to the integrity rate greater than a preset threshold as the characteristic matrix corresponding to the integrity rate equal to 1; and in a case that each of the integrity rates corresponding to the characteristic matrixes is less than or equal to the preset threshold, returning to the step of collecting at least two types of biological characteristic identity information of the to-be-identified user, for re-collection.

Optionally, the to-be-identified user is allowed to handle business on a currently-logged account in a case that the identity identification result indicates that the to-be-identified user passes identity identification; and the method returns to the step of collecting at least two types of biological characteristic identity information of the to-be-identified user and an alarm is raised to the logged account, in a case that the identity identification result indicates that the to-be-identified user fails to pass the identity identification.

Optionally, the standard matrix is reserved before an account is logged into for the first time using the method, the standard matrix is reserved by: collecting at least two types of biological characteristic identity information of an account holder; performing characteristic extraction on each type of the at least two types of collected biological characteristic identity information, to obtain characteristic information corresponding to the type of the biological characteristic identify information; establishing characteristic matrixes based on the characteristic information, where there is a one-to-one correspondence among the biological characteristic identity information, the characteristic information and the characteristic matrixes; performing normalization processing on each of the characteristic matrixes; performing dynamic weighting fusion on all of the normalized characteristic matrixes, to obtain a fused characteristic matrix corresponding to the account holder; and storing the fused characteristic matrix in a database as the standard matrix.

A device for authenticating an identity based on fusion of multiple biological characteristics is provided according to an embodiment of the present disclosure. The device includes: an identity information collecting module, a characteristic extracting module, a matrix establishing module, a normalization processing module, a fusing matrix module, a matching module, and an identifying module. The identity information collecting module is configured to collect at least two types of biological characteristic identity information of a to-be-identified user. The characteristic extracting module is configured to perform characteristic extraction on each type of the at least two types of collected biological characteristic identify information, to obtain characteristic information corresponding to the type of the biological characteristic identify information. The matrix establishing module is configured to establish characteristic matrixes based on the characteristic information, where there is a one-to-one correspondence among the biological characteristic identity information, the characteristic information and the characteristic matrixes. The normalization processing module is configured to perform normalization processing on each of the characteristic matrixes. The fusing matrix module is configured to perform dynamic weighting fusion on all of the normalized characteristic matrixes, to obtain a fused characteristic matrix. The matching module is configured to match the fused characteristic matrix with a preset standard matrix, to obtain a matching score. The identifying module is configured to obtain an identity identification result of the to-be-identified user based on a Bayesian decision model and the matching score.

Optionally, the fusing matrix module includes: an initial weighting value allocating unit, an integrity rate calculating unit, a weighting value adjusting unit and a weighting fusion unit. The initial weighting value allocating unit is configured to allocate an initial weighting value to each of the normalized characteristic matrixes according to a preset weighting value allocation criteria, where a sum of all of the weighting values is equal to 1. The integrity rate calculating unit is configured to calculate an integrity rate of the characteristic information corresponding to each of the characteristic matrixes. The weighting value adjusting unit is configured to adjust the weighting value of each of the characteristic matrixes based on the integrity rates while ensuring a sum of all of the weighting values is equal to 1. The weighting fusion unit is configured to perform weighting fusion on all of the normalized characteristic matrixes based on the adjusted weighting values, to obtain the fused characteristic matrix.

Optionally, the device further includes: a business allowing module and an alarm module. The business allowing module is configured to allow the to-be-identified user to handle business on a currently-logged account in a case that the identity identification result obtained by the identifying module indicates that the to-be-identified user passes identity identification. The alarm module is configured to return to the step of collecting at least two types of biological characteristic identity information of the to-be-identified user and raise an alarm to the logged account, in a case that the identity identification result obtained by the identifying module indicates that the to-be-identified user fails to pass the identity identification.

Optionally, the device further includes a reserving module configured to reserve the standard matrix before the device is used for the first time. The reserving module includes: an information collecting unit, a characteristic extracting unit, a characteristic matrix establishing unit, a normalizing unit, a matrix fusing unit and a storage unit. The information collecting unit is configured to collect at least two types of biological characteristic identity information of an account holder. The characteristic extracting unit is configured to perform characteristic extraction on each type of the at least two types of collected biological characteristic identity information, to obtain characteristic information corresponding to the type of the biological characteristic identify information. The characteristic matrix establishing unit is configured to establish characteristic matrixes based on the characteristic information, where there is a one-to-one correspondence among the biological characteristic identity information, the characteristic information and the characteristic matrixes. The normalizing unit is configured to perform normalization processing on each of the characteristic matrixes. The matrix fusing unit is configured to perform dynamic weighting fusion on all of the normalized characteristic matrixes, to obtain a fused characteristic matrix corresponding to the account holder. The storage unit is configured to store the fused characteristic matrix in a database as the standard matrix.

It can be seen from the above technical solutions that the embodiments of the present disclosure have the following advantages.

In the embodiments of the present disclosure, at least two types of biological characteristic identity information of the to-be-identified user are collected first, characteristic extraction is performed on each type of the at least two types of collected biological characteristic identity information to obtain characteristic information corresponding to the type of the biological characteristic identify information, characteristic matrixes are established based on the characteristic information, there is a one-to-one correspondence among the biological characteristic identity information, the characteristic information and the characteristic matrixes, normalization processing is performed on each of the characteristic matrixes, dynamic weighting fusion is performed on all of the normalized characteristic matrixes to obtain a fused characteristic matrix, the fused characteristic matrix is matched with a preset standard matrix to obtain a matching score, and an identity identification result of the to-be-identified user is obtained based on a Bayesian decision model and the matching score. In the embodiment of the present disclosure, the identity is authenticated based on more than two types of biological characteristic identity information, thereby improving an identification accuracy rate and no affecting the identification accuracy rate in a case that a part of the collected biological characteristic identity information is non-integral.

DETAILED DESCRIPTION OF THE EMBODIMENTS

A method and a device for authenticating an identity based on fusion of multiple biological characteristics are provided according to the embodiments of the present disclosure, to authenticate an identity based on more than two types of biological characteristic identity information, thereby improving an identification accuracy rate.

In order to make an objective, features and advantages of the present disclosure clearer and easier to be understood, the technical solutions according to the embodiments of the present disclosure are described clearly and completely with conjunction with the drawings in the embodiments of the present disclosure. Apparently, the embodiments described below are only a part rather than all of embodiments. Based on the embodiments of the present disclosure, all other embodiments acquired by those skilled in the art without creative work fall within the protection scope of the present disclosure.

Figure 1:
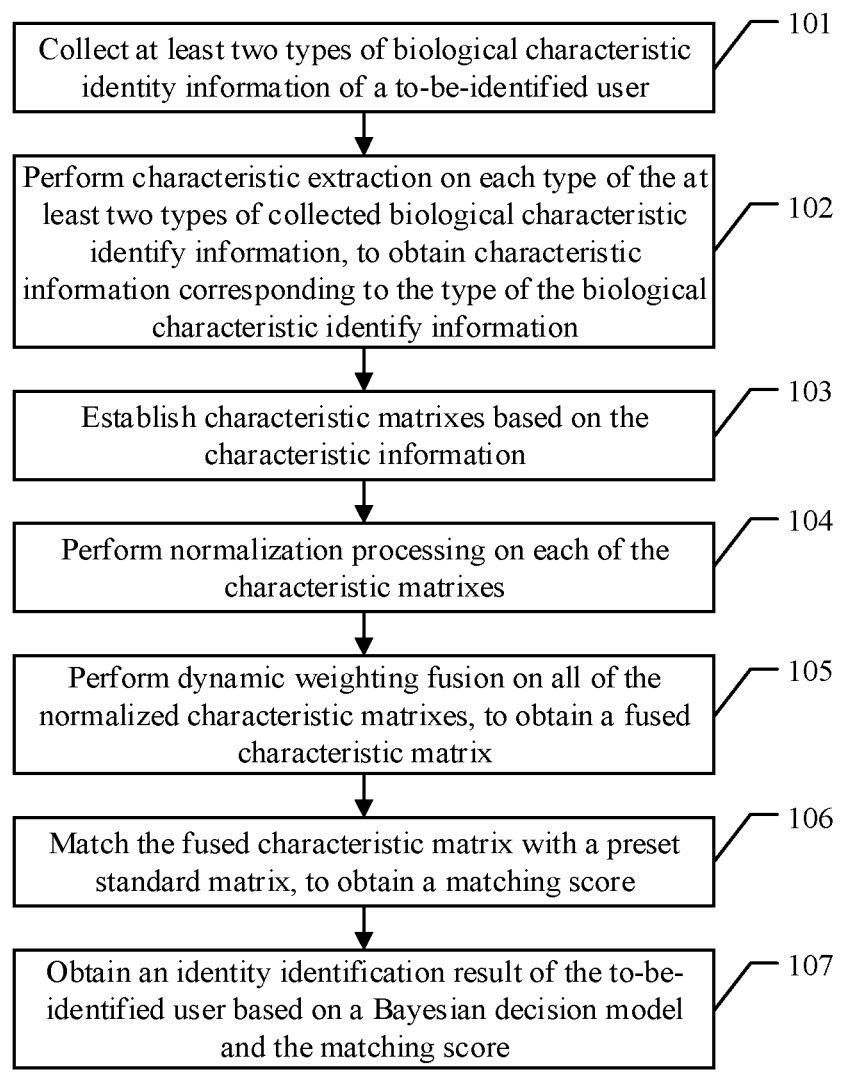
FIG. 1 is a flow diagram of a method for authenticating an identity based on fusion of multiple biological characteristics according to an embodiment of the present disclosure.

With reference to FIG. 1, a method for authenticating an identity based on fusion of multiple biological characteristics according to an embodiment of the present disclosure includes steps 101 to 107.

In step 101, at least two types of biological characteristic identity information of a to-be-identified user are collected.

First, at least two types of biological characteristic identity information of the to-be-identified user may be collected.

In step 102, characteristic extraction is performed on each type of the at least two types of collected biological characteristic identity information, to obtain characteristic information corresponding to the type of the biological characteristic identify information.

After the at least two types of biological characteristic identity information of the to-be-identified user are collected, characteristic extraction may be performed on each type of the at least two types of collected biological characteristic identity information, to obtain characteristic information corresponding to the type of the biological characteristic identify information.

In step 103, characteristic matrixes are established based on the characteristic information.

After the characteristic extraction is performed on each type of the at least two types of collected biological characteristic identity information to obtain the characteristic information corresponding to the type of the biological characteristic identify information, characteristic matrixes may be established based on the characteristic information. There is a one-to-one correspondence among the biological characteristic identity information, the characteristic information and the characteristic matrixes.

In step 104, normalization processing is performed on each of the characteristic matrixes.

After the characteristic matrixes are established based on the characteristic information, the normalization processing may be performed on each of the characteristic matrixes.

In step 105, dynamic weighting fusion is performed on all of the normalized characteristic matrixes, to obtain a fused characteristic matrix.

After the normalization processing is performed on each of the characteristic matrixes, dynamic weighting fusion may be performed on all of the normalized characteristic matrixes, to obtain a fused characteristic matrix.

In step 106, the fused characteristic matrix is matched with a preset standard matrix, to obtain a matching score.

After the dynamic weighting fusion is performed on all of the normalized characteristic matrixes to obtain the fused characteristic matrix, the fused characteristic matrix may be matched with a preset standard matrix, to obtain a matching score.

In step 107, an identity identification result of the to-be-identified user is obtained based on a Bayesian decision model and the matching score.

After the matching score is obtained, an identity identification result of the to-be-identified user may be obtained based on a Bayesian decision model and the matching score.

In the embodiment, at least two types of biological characteristic identity information of the to-be-identified user are collected first, characteristic extraction is performed on each type of the at least two types of collected biological characteristic identity information to obtain characteristic information corresponding to the type of the biological characteristic identify information, characteristic matrixes are established based on the characteristic information, there is a one-to-one correspondence among the biological characteristic identity information, the characteristic information and the characteristic matrixes, normalization processing is performed on each of the characteristic matrixes, dynamic weighting fusion is performed on all of the normalized characteristic matrixes to obtain a fused characteristic matrix, the fused characteristic matrix is matched with a preset standard matrix to obtain a matching score, and an identity identification result of the to-be-identified user is obtained based on a Bayesian decision model and the matching score. In the embodiment, the identity is authenticated based on more than two types of biological characteristic identity information, thereby improving an identification accuracy rate and no affecting the identification accuracy rate in a case that a part of the collected biological characteristic identity information is non-integral.

Figure 2:
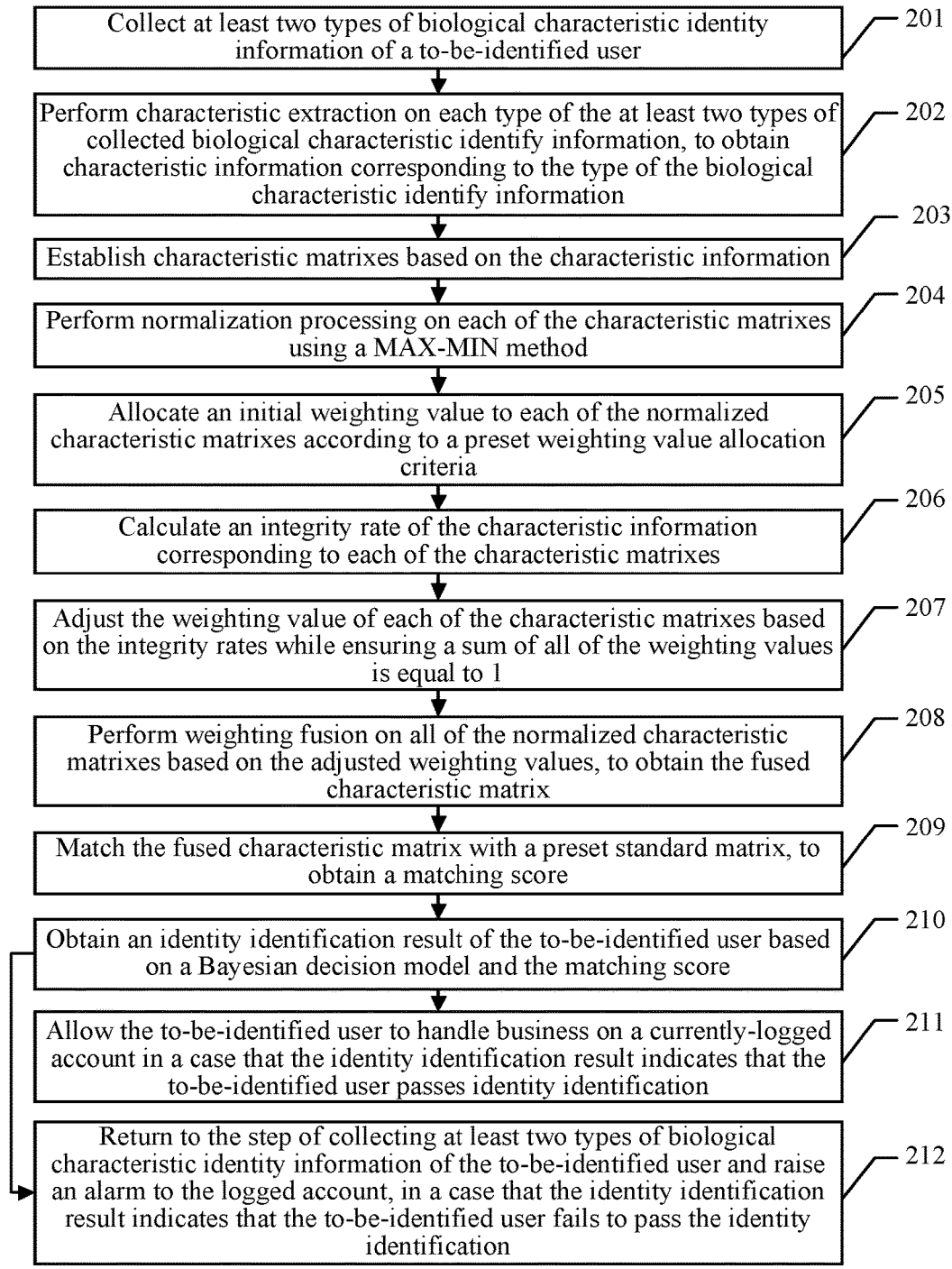
FIG. 2 is a flow diagram of a method for authenticating an identity based on fusion of multiple biological characteristics according to another embodiment of the present disclosure.

For convenience of understanding, a method for authenticating an identity based on fusion of multiple biological characteristics according to an embodiment of the present disclosure is described in detail below. With reference to FIG. 2, a method for authenticating an identity based on fusion of multiple biological characteristics according to another embodiment of the present disclosure includes steps 201 to 212.

In step 201, at least two types of biological characteristic identity information of a to-be-identified user are collected.

First, at least two types of biological characteristic identity information of a to-be-identified user may be collected. The biological characteristic identity information may include face, fingerprint, voice and the like. For example, a face image of the user may be collected using a face collecting device, fingerprint of the user may be collected using a fingerprint collecting device, and voice of the user may be collected using a voice collecting device. The collected information is uploaded to an information processing device.

In step 202, characteristic extraction is performed on each type of the at least two types of collected biological characteristic identity information, to obtain characteristic information corresponding to the type of the biological characteristic identify information.

After the at least two types of biological characteristic identity information of the to-be-identified user are collected, characteristic extraction may be performed on each type of the at least two types of collected biological characteristic identity information to obtain characteristic information corresponding to the type of the biological characteristic identify information. For example, gray processing may be performed on the face image, characteristic information may be extracted after the gray processing, and a face characteristic matrix may be established based on the characteristic information. Gray processing may be performed on a fingerprint image, characteristic information may be extracted after the gray processing, and a fingerprint characteristic matrix may be established based on the characteristic information. Noise-reducing processing may be performed on voice information, characteristic information may be extracted after the noise-reducing processing, and a voice characteristic matrix may be established based on the characteristic information.

In step 203, characteristic matrixes are established based on the characteristic information.

The characteristic matrixes may be established based on the characteristic information after the characteristic information is obtained. There is a one-to-one correspondence among the biological characteristic identity information, the characteristic information and the characteristic matrixes. It should be understood that one type of the collected biological characteristic identity information corresponds to one set of characteristic information, and one set of characteristic information corresponds to one characteristic matrix.

In step 204, normalization processing is performed on each of the characteristic matrixes using a MAX-MIN method.

After the characteristic matrixes are established based on the characteristic information, normalization processing may be performed on each of the characteristic matrixes using the MAX-MIN method, each element in each of the normalized characteristic matrixes ranges from 0 to 1, inclusively.

It is assumed that a face characteristic matrix is denoted as A, a fingerprint characteristic matrix is denoted as B, and a voice characteristic matrix is denoted as C, the characteristic matrix includes i rows and j columns, $a_{ij}$ denotes an element in the face matrix, $b_{ij}$ denotes an element in the fingerprint matrix, $c_{ij}$ denotes an element in the voice matrix, $a_{max}$ denotes a maximum element in the matrix A and $a_{min}$ denotes a minimum element in the matrix A, $b_{max}$ denotes a maximum element in the matrix B and $b_{min}$ min denotes a minimum element in the matrix B, $C_{max}$ denotes a maximum element in the matrix C and $c_{min}$ denotes a minimum element in the matrix C, normalization processing is performed on the matrix using the MAX-MIN method.

$$a'_{ij} = \left(\frac{a_{ij} - a_{min}}{a_{max} - a_{min}}\right), a'_{ij} \in [0, 1];$$

$$b'_{ij} = \left(\frac{b_{ij} - b_{min}}{b_{max} - b_{min}}\right), b'_{ij} \in [0, 1];$$

$$c'_{ij} = \left(\frac{c_{ij} - c_{min}}{c_{max} - c_{min}}\right), c'_{ij} \in [0, 1];$$

The normalized face characteristic matrix A' may be denoted by $a_{ij}'$, the normalized fingerprint characteristic matrix B' may be denoted by $b_{ij}'$, and the normalized voice characteristic matrix C' may be denoted by $C_{ij}'$.

With the MAX-MIN normalization method, the characteristic information originally distributed in the characteristic matrix may remain unchanged, and only a value range of the characteristic matrix is changed. Therefore, the single biological characteristic is not changed using the normalization method, and accordingly the characteristic information is not changed essentially after fusing the matrixes.

In step 205, an initial weighting value is allocated to each of the normalized characteristic matrixes according to a preset weighting value allocation criteria.

An initial weighting value may be allocated to each of the normalized characteristic matrixes according to a preset weighting value allocation criteria after the normalization processing. A sum of all of the weighting values is equal to 1.

In step 206, an integrity rate of the characteristic information corresponding to each of the characteristic matrixes is calculated.

After the initial weighting value is allocated to each of the normalized characteristic matrixes according to the preset weighting value allocation criteria, and the sum of all of the weighting values is equal to 1, an integrity rate of the characteristic information corresponding to each of the characteristic matrixes may be calculated.

In step 207, the weighting value of each of the characteristic matrixes is adjusted based on the integrity rates, while ensuring the sum of all of the weighting values is equal to 1.

After the integrity rate of the characteristic information corresponding to each of the characteristic matrixes is calculated, the weighting value of each of the characteristic matrixes may be adjusted based on the integrity rates while ensuring the sum of all of the weighting values is equal to 1, which may be implemented by the following steps.

In a case that the integrity rate corresponding to the characteristic matrix is less than 1, the weighting value of the characteristic matrix is proportionally decreased based on a missing rate corresponding to the characteristic matrix, where a sum of the integrity rate and the missing rate is equal to 1.

In a case that the integrity rate corresponding to the characteristic matrix is equal to 1, the weighting value of the characteristic matrix corresponding to the integrity rate equal to 1 is increased based on a proportion of the initial weighting value of the characteristic matrix when the weighting value of the characteristic matrix corresponding to the integrity rate less than 1 is decreased proportionally, while it is ensured that the sum of all of the weighting values is equal to 1.

In a case that each of the integrity rates corresponding to the characteristic matrixes is less than 1, the characteristic matrix corresponding to the integrity rate greater than a preset threshold is regarded as the characteristic matrix corresponding to the integrity rate equal to 1.

In a case that each of the integrity rates corresponding to the characteristic matrixes is less than or equal to the preset threshold, the method returns to the step of collecting at least two types of biological characteristic identity information of the to-be-identified user, for re-collection.

In step 208, weighting fusion may be performed on all of the normalized characteristic matrixes based on the adjusted weighting values, to obtain a fused characteristic matrix.

After the weighting value of each of the characteristic matrixes is adjusted based on the integrity rates, weighting fusion may be performed on all of the normalized characteristic matrixes based on the adjusted weighting values, to obtain a fused characteristic matrix.

Steps 205 to 208 in the embodiment are described in detail below in an application scenario. In the scenario, it is assumed that three types of biological characteristic identity information including face, fingerprint and voice are collected.

Weighting values $\alpha$, $\beta$ and $\lambda$ may be assigned based on different scenarios or different requirements for recognizing technical characteristics first.

The weighting values are then adjusted dynamically by a first step, a second step and a third step.

In the first step, the weighting values $\alpha$, $\beta$ and $\lambda$ are preset in the device (initial weighting values $\alpha$, $\beta$ and $\lambda$ are preset on the ATM machine based on actual needs), where $\alpha+\beta+\lambda=1$.

In the second step, whether the biological characteristic information collected by the device is integral is determined, to determine which biological characteristic information is non-integral, and an integrity rate and a missing rate of the collected biological characteristic information are calculated according to the principle of statistics.

In the third step, the weighting value corresponding to the biological characteristic information collected by the device is adjusted dynamically based on the integrity rate and the missing rate of the characteristic information. In a case that the collected biological characteristic information is non-integral, the weighting value corresponding to the biological characteristic information for fusion is decreased dynamically based on the missing rate of the characteristic information. In a case that the collected biological characteristic information is integral, the weighting value corresponding to the biological characteristic information for fusion is increased dynamically based on a proportion of the initial weighting value of the biological characteristic information.

In a fourth step, the final weighting values $\alpha$, $\beta$ and $\lambda$ corresponding to the biological characteristic information are outputted after the dynamic adjustment, where $\alpha+\beta+\lambda=1$.

In a case that the collected biological characteristic information is non-integral, the weighting value corresponding to the biological characteristic information is decreased based on the missing rate of the collected biological characteristic information, and the weighting values of other two types of collected integral biological characteristic information may be increased by a decrement of the weighting value of the collected non-integral biological characteristic information based on proportions of the weighting values. In a case that the two types of collected biological characteristic information are each non-integral, the weighting value of the integral biological characteristic information is increased by a sum of decrements of the weighting values of the collected non-integral biological characteristic information. In a case that the three types of collected biological characteristic information are each non-integral, the collected biological characteristic information having the integrity rate greater than 95% is regarded as the collected integral biological characteristic information, and the weighting values of the biological characteristic information are adjusted dynamically. In a case that the integrity rates of the three types of collected biological characteristic information are each less than 95%, the method returns to the step of collecting biological characteristic information, to recollect biological characteristic information.

After the final values $\alpha$, $\beta$ and $\lambda$ are obtained, fusion is performed as follows on the matrixes.

$$D=\alpha A'+\beta B'+\lambda C'$$

where $\alpha$ denotes the weighting value of the face characteristic matrix, $\beta$ denotes the weighting value of the fingerprint characteristic matrix, $\lambda$ denotes the weighting value of the voice characteristic matrix, and D denotes a new fused matrix. Each of the characteristic matrixes corresponds one weighting value, to perform weighting fusion on the characteristic matrixes.

A good solution for recognizing the technical characteristics is obtained according to experiments, as shown Table 1.

TABLE 1

| Technical characteristic recognition | Face | Fingerprint | Voice |
|---|---|---|---|
| Universality | High | Intermediate | Intermediate |
| Uniqueness | Low | High | Low |
| Persistence | Intermediate | High | Low |
| Collection | High | Intermediate | Intermediate |
| Performance | Low | High | Low |
| Acceptability | High | Intermediate | High |
| Anti-falsification | Low | High | Low |

According to the levels shown in above Table 1, a low level is denoted as 0, and an intermediate level is denoted as 1, and a high level is denoted as 2, and the face corresponds to 7, the fingerprint corresponds to 11, and the voice corresponds to 4, and it can be obtained that $\alpha=7/22$, $\beta=1/2$, $\lambda=2/11$.

The above weighting values are allocated in a case that the face information, the fingerprint information and the voice information are collected ideally. In a case that one type of collected characteristic information is non-integral, the weighting value corresponding to the characteristic information is decreased, and the weighting values corresponding to the other two types of collected characteristic information are increased proportionally. In a case that the collected face characteristic information is non-integral, the weighting value of the face characteristic matrix is decreased, and according to Table 1, the weighting value of the fingerprint characteristic matrix is increased by eleven fifteenth of the decrement of the weighting value of the face characteristic matrix, and the weighting value of the voice characteristic matrix is increased by four fifteenth of the decrement of the weighting value of the face characteristic matrix, and so forth. In a case that the fingerprint characteristic information is non-integral, the weighting value of the face characteristic matrix is increased by seven eleventh of a decrement of the weighting value of the fingerprint characteristic matrix, and the weighting value of the voice characteristic matrix is increased by four eleventh of the decrement of the weighting value of the fingerprint characteristic matrix. In a case that the voice characteristic information is non-integral, the weighting value of the face characteristic matrix is increased by seven eighteenth of a decrement of the weighting value of the voice characteristic matrix, and the weighting value of the fingerprint characteristic matrix is increased by eleven eighteenth of the decrement of the weighting value of the voice characteristic matrix. In a case that two types of characteristic information are each non-integral, the weighting value corresponding to the integral characteristic information is increased by a sum of the decrements of the weighting values corresponding to the two types of non-integral characteristic information. In a case that the three types of collected biological characteristic information are each non-integral, the collected biological characteristic information having the integrity rate greater than or equal to 95% is regarded as integral biological characteristic information, and the weighting values are adjusted dynamically. In a case that the integrity rates of the three types of biological characteristic information are each less than 95%, the method directly returns to the step of collecting the biological characteristic information, to recollect the biological characteristic information.

Each matrix includes i×j pieces of characteristic information, and X pieces of characteristic information are collected, and an integrity rate of the collected characteristic information is represented as:

$$\frac{X}{i \times j}.$$

A missing rate of the characteristic information is represented as:

$$1 - \frac{X}{i \times j}.$$

In a case that the face characteristic information is non-integral, the weighting value is adjusted as follows.

$$\alpha = \frac{7}{22} * \frac{X}{i \times j}.$$

A decrement of the weighting value is represented as:

$$\alpha_1 = \frac{7}{22} - \frac{7}{22} * \frac{X}{i \times j}.$$

The weighting values corresponding to the fingerprint and the voice are adjusted as follows:

$$\beta = 1/2 + \alpha_1 * 11/15;$$

$$\lambda = 2/11 + \alpha_1 * 4/15.$$

And so forth, Y pieces of fingerprint characteristic information are collected, and the weighting values are adjusted as follows:

$$\beta = \frac{1}{2} * \frac{Y}{i*j};$$

$$\beta_1 = \frac{1}{2} - \frac{1}{2} * \frac{Y}{i \times j};$$

$$\alpha = \frac{7}{22} + \beta_1 * \frac{7}{11};$$

$$\lambda = \frac{2}{11} + \beta_1 * \frac{4}{11}.$$

Z pieces of voice characteristic information are collected, and the weighting values are adjusted as follows:

$$\lambda = \frac{2}{11} * \frac{Z}{i \times j};$$

$$\lambda_1 = \frac{2}{11} - \frac{2}{11} * \frac{Z}{i \times j};$$

$$\alpha = \frac{7}{22} + \lambda_1 * \frac{7}{18};$$

$$\beta = \frac{1}{2} + \lambda_1 * \frac{11}{18}.$$

In a case that two types of collected characteristic information are each non-integral, the weighting values are adjusted as follows:

$$\alpha = \frac{7}{22} + \beta_1 + \lambda_1;$$

$$\beta = \frac{1}{2} * \frac{Y}{i \times j};$$

$$\lambda = \frac{2}{11} * \frac{Z}{i \times j}.$$

Alternatively, the weighting values are adjusted as follows:

$$\beta = \frac{1}{2} + \alpha_1 + \lambda_1;$$

$$\alpha = \frac{7}{22} * \frac{X}{i \times j};$$

$$\lambda = \frac{2}{11} * \frac{Z}{i \times j}.$$

Alternatively, the weighting values are adjusted as follows:

$$\lambda = \frac{2}{11} + \alpha_1 + \beta_1;$$

$$\alpha = \frac{7}{22} * \frac{X}{i \times j};$$

$$\beta = \frac{1}{2} * \frac{Y}{i \times j}.$$

With the method for dynamically adjusting the weighting values, in a case that one or more collected characteristics are not clear, the weighting values of the characteristic matrixes to which the one or more collected unclear characteristics belong for weighting fusion may be decreased, and the weighting value of the characteristic matrix to which the collected clear characteristic information belongs is increased accordingly, thereby solving a problem of noise interference caused by some collected non-integral or unclear biological characteristic.

In step 209, the fused characteristic matrix is matched with a preset standard matrix, to obtain a matching score.

After the fused characteristic matrix is obtained, the fused characteristic matrix may be matched with the preset standard matrix, to obtain a matching score. A matching process may be represented as:

$$S_{ij} = \frac{d_{ij} - e_{ij}}{e_{ij}}$$

where $d_{ij}$ denotes an element in an i-th row and a j-th column in the fused characteristic matrix, $e_{ij}$ denotes an element in an i-th row and a j-th column in a matrix stored in a database, $S_{ij}$ denotes a matching score of the element in an i-th row and a j-th column.

It should be illustrated that a set of matching scores generated according to a principle of matching the fused characteristic matrix with the preset standard matrix is represented as follows.

$$S' = \{s_{ij} | i,j = 1, 2, \ldots N\}$$

where a matching score $S \in S'$, and i and j denote an i-th row and a j-th column in the matrix, respectively.

It should be illustrated that the preset standard matrix is reserved before the account is logged into for the first time using the method. The standard matrix is reserved by step 1 to step 6 as follows.

In step 1, at least two types of biological characteristic identity information of an account holder are collected.

In step 2, characteristic extraction is performed on each type of the at least two types of collected biological characteristic identity information, to obtain characteristic information corresponding to the type of the biological characteristic identify information.

In step 3, characteristic matrixes are established based on the characteristic information.

There is a one-to-one correspondence among the biological characteristic identity information, the characteristic information and the characteristic matrixes.

In step 4, normalization processing is performed on each of the characteristic matrixes.

In step 5, dynamic weighting fusion is performed on all of the normalized characteristic matrixes, to obtain a fused characteristic matrix corresponding to the account holder.

In step 6, the fused characteristic matrix is stored in a database as the standard matrix.

In this way, the standard matrix is reserved, so that the fused characteristic matrix is matched with the reserved standard matrix when the method is used subsequently for the user.

In step 210, an identity identification result of the to-be-identified user is obtained based on a Bayesian decision model and the matching score.

After the matching score is obtained, an identity identification result of the to-be-identified user may be obtained based on a Bayesian decision model and the matching score.

Following the above step S209, an application scenario is used below for illustration.

In an authentication mode, there are two types of identity identification, one refers to that identity identification is passed, and the other refers to that identity identification is not passed. H=1 denotes that identity identification is passed, and H=0 denotes that the identity identification is not passed. It is known that a prior probability is represented as g=P(H=1), and P(H=0)=1−g due to a mutual exclusion relation, a posterior probability of the identity is represented as follows according to a Bayesian theory.

$$p = P(H = 1 | S) = \frac{P(S | H = 1)g}{P(S | H = 0)(1 - g) + P(S | H = 1)g}$$

where S is a matching score, and the above equation is simplified as:

$$P = \left\{1 + \left[\frac{g}{1-g} \frac{P(S|H=1)}{P(S|H=0)}\right]^{-1}\right\}^{-1}$$

A risk function of a correct decision and an incorrect decision for identity authentication is defined as $E_{nm}$, n, $m \in \{0, 1\}$, $E_{nm} = 0$ in the case of n=m, and $E_{nm} = 1$ in a case of n≠m, and a Beyesian conditional risk is represented as:

$$F = F\{E_{nm}\}$$
$$= E_{00} P(G=0, H=0) + E_{01} P(G=0, H=1) +$$
$$E_{10} P(G=1, H=0) + E_{11} P(G=1, H=1)$$

An identity identification decision is represented as follows according the minimal risk beyesian decision theory.

$$G = \begin{cases} 1, & \frac{P(S|H=1)}{P(S|H=0)} > \frac{1-g}{g} \frac{E_{10} - E_{00}}{E_{01} - E_{11}} \\ 0, & \text{else} \end{cases}$$

In order to simplify the threshold, a 0-1 risk function is used in the present disclosure, a risk is equal to 0 in a case of correct determination, and a risk is equal to 1 in a case of incorrect determination. It is assumed that g=P(H=1)=½, that is, it is considered that a probability of identifying as a real identity is equal to a probability of identifying as a fake identity. A fusion decision function is represented as:

$$G = \begin{cases} 1, & \frac{P(S|H=1)}{P(S|H=0)} > 1 \\ 0, & \text{else} \end{cases}$$

The identity can be determined and identified using the Bayesian decision and in conjunction with a determination function, thereby reducing a false positive rate, and controlling the risk to be in an acceptable range of the financial industry.

After the authentication is passed, the user may select business to be handled. In a case that the authentication is not passed, the method returns to collect information and raises an alarm (a text message is transmitted to the account holder, to notify the account holder that someone is trying to operate the account).

In step 211, the to-be-identified user is allowed to handle business on the currently-logged account in a case that the identity identification result indicates that identity identification is passed.

After the identity identification result of the to-be-identified user is obtained, the to-be-identified user is allowed to handle business on the currently-logged account in a case that the identity identification result indicates that the identity identification is passed.

In step 212, the method returns to the step of collecting at least two types of biological characteristic identity information of the to-be-identified user and an alarm is raised to the logged account, in a case that the identity identification result indicates that the identity identification is not passed.

After the identity identification result of the to-be-identified user is obtained, the method returns to the step of collecting at least two types of biological characteristic identity information of the to-be-identified user and an alarm is raised to the logged account, in a case that the identity identification result indicates that identity identification is not passed. For example, a text message may be transmitted to the account holder, to notify the account holder that someone is trying to operate the account.

Figure 3:
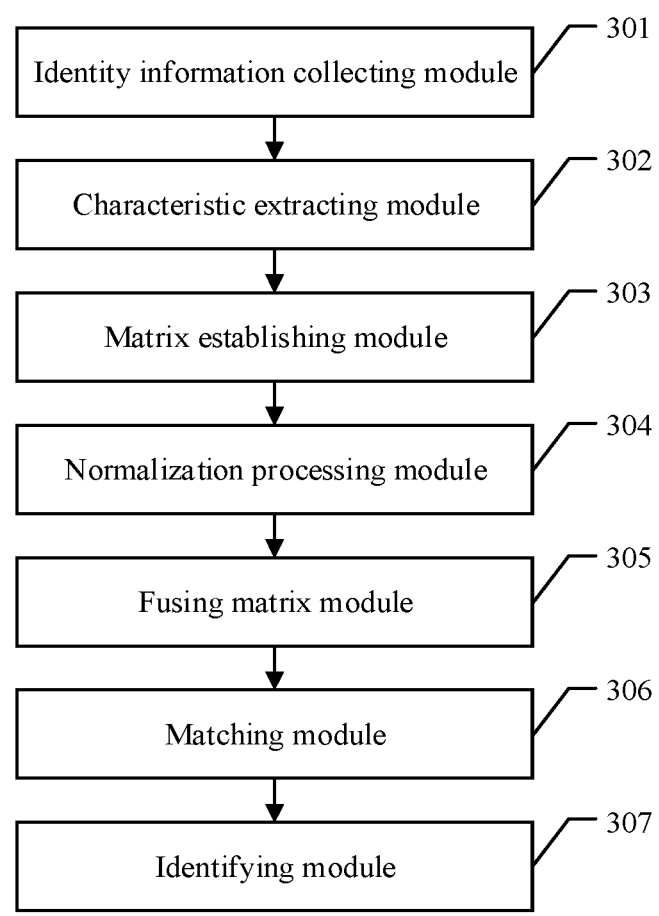
FIG. 3 is a structural diagram of a device for authenticating an identity based on fusion of multiple biological characteristics according to an embodiment of the present disclosure.

The method for authenticating an identity based on fusion of multiple biological characteristics is described above, and a device for authenticating an identity based on fusion of multiple biological characteristics is described in detail below. With reference to FIG. 3, the device for authenticating an identity based on fusion of multiple biological characteristics according to the embodiment of the present disclosure includes an identity information collecting module 301, a characteristic extracting module 302, a matrix establishing module 303 and a normalization processing module 304, a fusing matrix module 305, a matching module 306 and an identifying module 307.

The identity information collecting module 301 is configured to collect at least two types of biological characteristic identity information of a to-be-identified user.

The characteristic extracting module 302 is configured to perform characteristic extraction on each type of the at least two types of collected biological characteristic identity information, to obtain characteristic information corresponding to the type of the biological characteristic identify information.

The matrix establishing module 303 is configured to establish characteristic matrixes based on the characteristic information. There is a one-to-one correspondence among the biological characteristic identity information, the characteristic information and the characteristic matrixes.

The normalization processing module 304 is configured to perform normalization processing on each of the characteristic matrixes.

The fusing matrix module 305 is configured to perform dynamic weighting fusion on all of the normalized characteristic matrixes, to obtain a fused characteristic matrix.

The matching module 306 is configured to match the fused characteristic matrix with a preset standard matrix, to obtain a matching score.

The identifying module 307 is configured to obtain an identity identification result of the to-be-identified user based on the Bayesian decision model and the matching score.

In the embodiment, the identity information collecting module 301 collects at least two types of biological characteristic identity information of the to-be-identified user, the characteristic extracting module 302 performs characteristic extraction on each type of the at least two types of collected biological characteristic identity information, to obtain characteristic information corresponding to the type of the biological characteristic identify information, the matrix establishing module 303 establishes characteristic matrixes based on the characteristic information, there is a one-to-one correspondence among the biological characteristic identity information, the characteristic information and the characteristic matrixes, the normalization processing module 304 performs normalization processing on each of the characteristic matrixes, the fusing matrix module 305 performs dynamic weighting fusion on all of the normalized characteristic matrixes to obtain a fused characteristic matrix, the matching module 306 matches the fused characteristic matrix with a preset standard matrix to obtain a matching score, and the identifying module 307 obtains an identity identification result of the to-be-identified user based on the Bayesian decision model and the matching score. In the embodiment, the identity is authenticated based on more than two types of biological characteristic identity information, thereby improving an identification accuracy rate, and no affecting the identification accuracy rate in a case that a part of collected biological characteristic identity information is non-integral.

Figure 4:
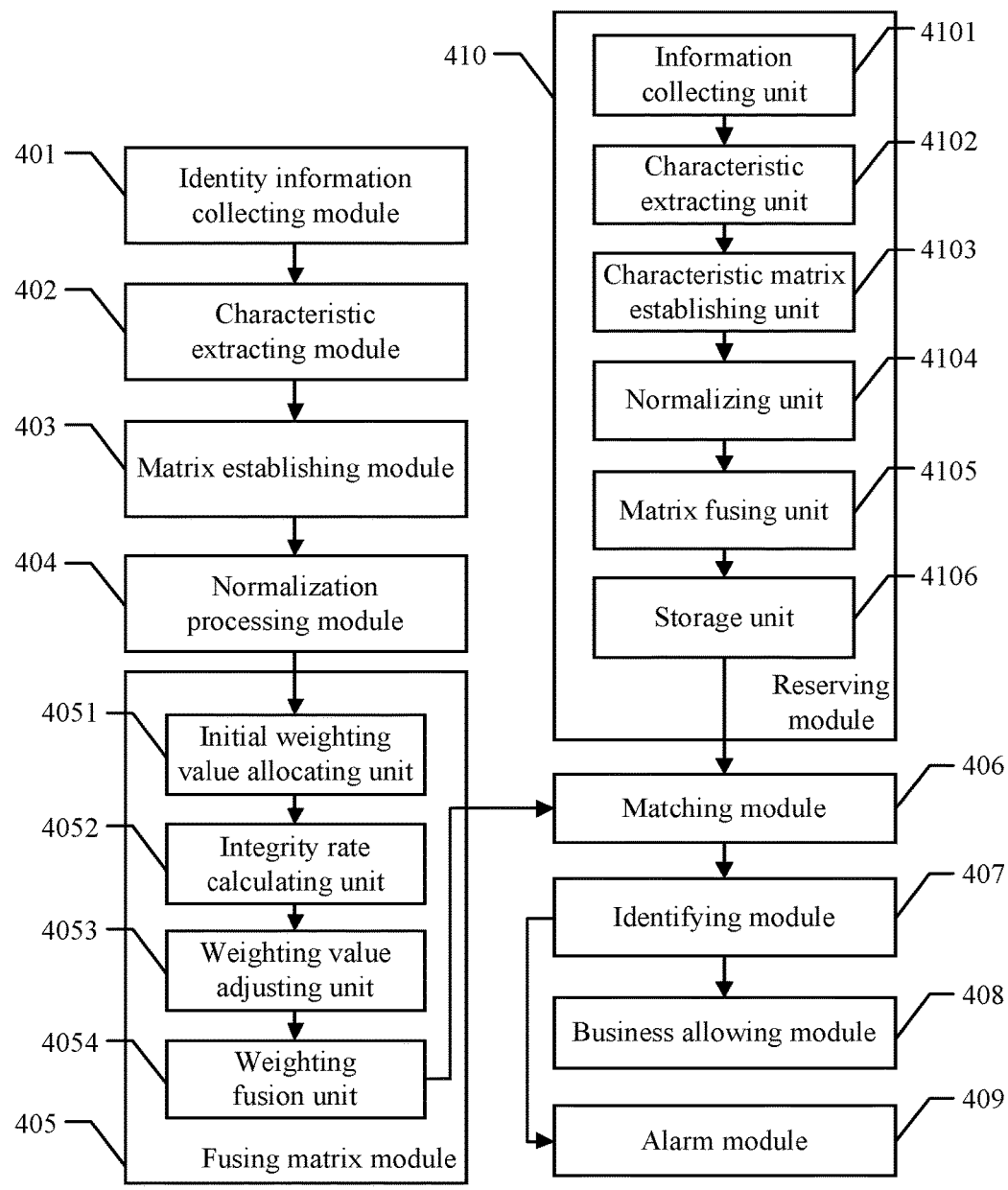
FIG. 4 is a structural diagram of a device for authenticating an identity based on fusion of multiple biological characteristics according to another embodiment of the present disclosure.

For convenience of understanding, the device for authenticating an identity based on fusion of multiple biological characteristics according to the embodiment of the present disclosure is described in detail, with reference to FIG. 4, the device for authenticating an identity based on fusion of multiple biological characteristics according to another embodiment of the present disclosure includes an identity information collecting module 401, a characteristic extracting module 402, a matrix establishing module 403 and a normalization processing module 404, a fusing matrix module 405, a matching module 406 and an identifying module 407.

The identity information collecting module 401 is configured to collect at least two types of biological characteristic identity information of a to-be-identified user.

The characteristic extracting module 402 is configured to perform characteristic extraction on each type of the at least two types of collected biological characteristic identity information, to obtain characteristic information corresponding to the type of the biological characteristic identify information.

The matrix establishing module 403 is configured to establish characteristic matrixes based on the characteristic information. There is a one-to-one correspondence among the biological characteristic identity information, the characteristic information and the characteristic matrixes.

The normalization processing module 404 is configured to perform normalization processing on each of the characteristic matrixes.

The fusing matrix module 405 is configured to perform dynamic weighting fusion on all of the normalized characteristic matrixes, to obtain a fused characteristic matrix.

The matching module 406 is configured to match the fused characteristic matrix with a preset standard matrix, to obtain a matching score.

The identifying module 407 is configured to obtain an identity identification result of the to-be-identified user based on the Bayesian decision model and the matching score.

The fusing matrix module 405 in the embodiment may include an initial weighting value allocating unit 4051, an integrity rate calculating unit 4052, a weighting value adjusting unit 4053 and a weighting fusion unit 4054.

The initial weighting value allocating unit 4051 is configured to allocate an initial weighting value to each of the normalized characteristic matrixes according to a preset weighting value allocation criteria. A sum of all of the weighting values is equal to 1.

The integrity rate calculating unit 4052 is configured to calculate an integrity rate of the characteristic information corresponding to each of the characteristic matrixes.

The weighting value adjusting unit 4053 is configured to adjust the weighting value of each of the characteristic matrixes based on the integrity rates, while ensuring a sum of all of the weighting values is equal to 1.

The weighting fusion unit 4054 is configured to perform weighting fusion on all of the normalized characteristic matrixes based on the adjusted weighting values, to obtain a fused characteristic matrix.

The device according to the embodiment may further include a business allowing module 408 and an alarm module 409.

The business allowing module 408 is configured to allow the to-be-identified user to handle business on the currently-logged account in a case that the identity identification result obtained by the identifying module 407 indicates that the to-be-identified user passes the identity identification.

The alarm module 409 is configured to return the step of collecting at least two types of biological characteristic identity information of the to-be-identified user and raise an alarm to the logged account in a case that the identity identification result obtained by the identifying module 407 indicates that the to-be-identified user fails to pass the identity identification.

The device according to the embodiment may further include a reserving module 410 configured to reserve the standard matrix before the device is used for the first time. The reserving module 410 includes an information collecting unit 4101, a characteristic extracting unit 4102, a characteristic matrix establishing unit 4103, a normalizing unit 4104, a matrix fusing unit 4105 and a storage unit 4106.

The information collecting unit 4101 is configured to collect at least two types of biological characteristic identity information of an account holder.

The characteristic extracting unit 4102 is configured to perform characteristic extraction on each type of the at least two types of collected biological characteristic identity information, to obtain characteristic information corresponding to the type of the biological characteristic identify information.

The characteristic matrix establishing unit 4103 is configured to establish characteristic matrixes based on the characteristic information. There is a one-to-one correspondence among the biological characteristic identity information, the characteristic information and the characteristic matrixes.

The normalizing unit 4104 is configured to perform normalization processing on each of the characteristic matrixes.

The matrix fusing unit 4105 is configured to perform dynamic weighting fusion on all of the normalized characteristic matrixes, to obtain a fused characteristic matrix corresponding to the account holder.

The storage unit 4106 is configured to store the fused characteristic matrix in a database as the standard matrix.

It may be clearly understood by those skilled in the art that, for convenience and ease of description, operating processes of the system, the device and the unit described above may refer to the corresponding processes in the above method embodiment, which are not described herein anymore.

In several embodiments according to the present disclosure, it should be understood that the disclosed system, device and method can be implemented in other ways. The device embodiments described above are merely schematic. For example, the division of the unit is merely a logic functional division, and there may be other division manners in practice. For example, multiple units or components may be combined, or may be integrated into another system, or some features may be ignored or not be executed. In addition, coupling, direct coupling or a communication connection shown or discussed may be indirect coupling or communication connection via some interfaces, devices or units, which may be electrical, mechanical, or in other form.

The units illustrated as separate components may be or may not be separated physically, and the component displayed as a unit may be or may not be a physical unit. That is, the components may be located at the same place, or may be distributed on multiple network units, and some or all of the units may be selected as required, to realize the objective of the solution of the embodiments.

In addition, all function units according to the embodiments of the present disclosure may be integrated into one processing unit, or may be each a separate unit physically, or two or more units are integrated into one unit. The integrated unit described above may be realized with hardware, or may be realized by a software function unit.

If the integrated unit is implemented in the form of software function unit and the software function unit is sold or used as a separate product, the software function unit may also be stored in a computer readable storage medium. Based on such understanding, an essential part of the technical solutions of the present disclosure, i.e., the part of the technical solutions of the present disclosure that contribute to the existing technology, or all or a part of the technical solutions may be embodied in the form of a computer software product. The computer software product is stored in a storage medium, and includes several instructions for instructing a computer device (which may be a personal computer, a server, a network device or the like) to implement all or a part of the steps of the methods according to the embodiments of the present disclosure. The foregoing storage medium includes various media that can store program codes, for example, a USB disk, a mobile hard disk drive, a Read-Only Memory (ROM), a Random Access Memory (RAM), a magnetic disk, an optical disk and the like.

The foregoing embodiments are only described for illustrating the technical solutions of the present disclosure, and not for limiting the technical solutions. Although the present disclosure is illustrated in detail with reference to the embodiments described above, it should be understood by those skilled in the art that modification can be made to the technical solutions recited in the embodiments described above, or equivalent substitution can be made onto a part of technical features of the technical solution. The modification and equivalent substitution cannot make essence of the technical solutions depart from spirit and a scope of the technical solutions according to the embodiments of the present disclosure.

The invention claimed is:

1. A method for authenticating an identity based on fusion of a plurality of biological characteristics, comprising:
   collecting at least two types of biological characteristic identity information of a to-be-identified user;

performing characteristic extraction on each type of the at least two types of biological characteristic identify information, to obtain sets of characteristic information, wherein there is a one-to-one correspondence between the sets of characteristic information and the at least two types of biological characteristic identify information;

establishing characteristic matrixes based on the sets of characteristic information, wherein there is another one-to-one correspondence between the sets of characteristic information and the characteristic matrixes;

performing normalization processing on each of the characteristic matrixes;

performing dynamic weighting fusion on all of the normalized characteristic matrixes, to obtain a fused characteristic matrix;

matching the fused characteristic matrix with a preset standard matrix, to obtain a matching score; and obtaining an identity identification result of the to-be-identified user based on a Bayesian decision model and the matching score;

wherein the performing dynamic weighting fusion on all of the normalized characteristic matrixes to obtain a fused characteristic matrix comprises:

allocating an initial weighting value to each of the normalized characteristic matrixes according to a preset weighting value allocation criteria, wherein a sum of all of the initial weighting values is equal to 1;

calculating an integrity rate for each of the sets of characteristic information corresponding to the characteristic matrixes, wherein the integrity rate is a ratio of a quantity of elements in the set of characteristic information to a quantity of elements in the corresponding characteristic matrix;

adjusting the initial weighting value of each of the normalized characteristic matrixes based on the integrity rates while ensuring a sum of all of the adjusted weighting values is equal to 1; and performing weighting fusion on all of the normalized characteristic matrixes based on the adjusted weighting values, to obtain the fused characteristic matrix.

2. The method according to claim 1, wherein the performing normalization processing on each of the characteristic matrixes comprises: performing normalization processing on each of the characteristic matrixes using a MAX-MIN method, wherein each element in each of the normalized characteristic matrixes ranges from 0 to 1, inclusively.

3. The method according to claim 2, wherein the standard matrix is reserved before an account is logged into for the first time using the method, and the standard matrix is reserved by:

collecting at least two types of biological characteristic identity information of an account holder;

performing characteristic extraction on each type of the at least two types of collected biological characteristic identity information of the account holder, to obtain sets of characteristic information of the account holder, wherein there is a one-to-one correspondence between the sets of characteristic information of the account holder and the at least two types of biological characteristic identify information of the account holder;

establishing characteristic matrixes of the account holder based on the sets of characteristic information of the account holder, wherein there is another one-to-one correspondence between the sets of characteristic information of the account holder and the characteristic matrixes of the account holder;

performing the normalization processing on each of the characteristic matrixes of the account holder;

performing the dynamic weighting fusion on all of the normalized characteristic matrixes of the account holder, to obtain a fused characteristic matrix corresponding to the account holder; and storing the fused characteristic matrix corresponding to the account holder in a database as the standard matrix.

4. The method according to claim 1, wherein the adjusting the weighting value of each of the characteristic matrixes based on the integrity rates while ensuring a sum of all of the weighting values is equal to 1 comprises:

in a case that the integrity rate corresponding to one of the characteristic matrixes is less than 1, proportionally decreasing the initial weighting value of the one of the characteristic matrixes based on a missing rate corresponding to the one of the characteristic matrixes, wherein a sum of the integrity rate and the missing rate is equal to 1;

in a case that the integrity rate corresponding to one of the characteristic matrixes is equal to 1, increasing the initial weighting value of the one of the characteristic matrixes corresponding to the integrity rate equal to 1 based on a proportion of the initial weighting value of the one of the characteristic matrixes, when the initial weighting value of another one of the characteristic matrixes corresponding to the integrity rate less than 1 is decreased proportionally, while ensuring the sum of all of the weighting values is equal to 1;

in a case that each of the integrity rates corresponding to the characteristic matrixes is less than 1, regarding one of the characteristic matrixes corresponding to the integrity rate greater than a preset threshold as a characteristic matrix corresponding to the integrity rate equal to 1; and in a case that each of the integrity rates corresponding to the characteristic matrixes is less than or equal to the preset threshold, returning to the step of collecting at least two types of biological characteristic identity information of the to-be-identified user, for re-collection.

5. The method according to claim 4, wherein the standard matrix is reserved before an account is logged into for the first time using the method, and the standard matrix is reserved by:

collecting at least two types of biological characteristic identity information of an account holder;

performing characteristic extraction on each type of the at least two types of collected biological characteristic identity information of the account holder, to obtain sets of characteristic information of the account holder, wherein there is a one-to-one correspondence between the sets of characteristic information of the account holder and the at least two types of biological characteristic identify information of the account holder;

establishing characteristic matrixes of the account holder based on the sets of characteristic information of the account holder, wherein there is another one-to-one correspondence between the sets of characteristic information of the account holder and the characteristic matrixes of the account holder;

performing the normalization processing on each of the characteristic matrixes of the account holder;

performing the dynamic weighting fusion on all of the normalized characteristic matrixes of the account holder, to obtain a fused characteristic matrix corresponding to the account holder; and
storing the fused characteristic matrix corresponding to the account holder in a database as the standard matrix.

6. The method according to claim 1, wherein the to-be-identified user is allowed to handle business on a currently-logged account in a case that the identity identification result indicates that the to-be-identified user passes identity identification; and the method returns to the step of collecting at least two types of biological characteristic identity information of the to-be-identified user and an alarm is raised to the logged account, in a case that the identity identification result indicates that the to-be-identified user fails to pass the identity identification.

7. The method according to claim 6, wherein the standard matrix is reserved before an account is logged into for the first time using the method, and the standard matrix is reserved by:
 collecting at least two types of biological characteristic identity information of an account holder;
 performing characteristic extraction on each type of the at least two types of collected biological characteristic identity information of the account holder, to obtain sets of characteristic information of the account holder, wherein there is a one-to-one correspondence between the sets of characteristic information of the account holder and the at least two types of biological characteristic identify information of the account holder;
 establishing characteristic matrixes of the account holder based on the sets of characteristic information of the account holder, wherein there is another one-to-one correspondence between the sets of characteristic information of the account holder and the characteristic matrixes of the account holder;
 performing the normalization processing on each of the characteristic matrixes of the account holder;
 performing the dynamic weighting fusion on all of the normalized characteristic matrixes of the account holder, to obtain a fused characteristic matrix corresponding to the account holder; and
 storing the fused characteristic matrix corresponding to the account holder in a database as the standard matrix.

8. The method according to claim 1, wherein the standard matrix is reserved before an account is logged into for the first time using the method, and the standard matrix is reserved by:
 collecting at least two types of biological characteristic identity information of an account holder;
 performing characteristic extraction on each type of the at least two types of collected biological characteristic identity information of the account holder, to obtain sets of characteristic information of the account holder, wherein there is a one-to-one correspondence between the sets of characteristic information of the account holder and the at least two types of biological characteristic identify information of the account holder;
 establishing characteristic matrixes of the account holder based on the sets of characteristic information of the account holder, wherein there is another one-to-one correspondence between the sets of characteristic information of the account holder and the characteristic matrixes of the account holder;
 performing the normalization processing on each of the characteristic matrixes of the account holder;
 performing the dynamic weighting fusion on all of the normalized characteristic matrixes of the account holder, to obtain a fused characteristic matrix corresponding to the account holder; and
 storing the fused characteristic matrix corresponding to the account holder in a database as the standard matrix.

9. A device for authenticating an identity based on fusion of a plurality of biological characteristics, comprising:
 an identity information collecting module configured to collect at least two types of biological characteristic identity information of a to-be-identified user;
 a characteristic extracting module configured to perform characteristic extraction on each type of the at least two types of biological characteristic identify information, to obtain sets of characteristic information, wherein there is a one-to-one correspondence between the sets of characteristic information and the at least two types of biological characteristic identify information;
 a matrix establishing module configured to establish characteristic matrixes based on the sets of characteristic information, wherein there is another one-to-one correspondence between the sets of characteristic information and the characteristic matrixes;
 a normalization processing module configured to perform normalization processing on each of the characteristic matrixes;
 a fusing matrix module configured to perform dynamic weighting fusion on all of the normalized characteristic matrixes, to obtain a fused characteristic matrix;
 a matching module configured to match the fused characteristic matrix with a preset standard matrix, to obtain a matching score; and
 an identifying module configured to obtain an identity identification result of the to-be-identified user based on a Bayesian decision model and the matching score;
 wherein the fusing matrix module comprises:
  an initial weighting value allocating unit configured to allocate an initial weighting value to each of the normalized characteristic matrixes according to a preset weighting value allocation criteria, wherein a sum of all of the initial weighting values is equal to 1;
  an integrity rate calculating unit configured to calculate an integrity rate for each of the characteristic information corresponding to the characteristic matrixes, wherein the integrity rate is a ratio of a quantity of elements in the set of characteristic information to a quantity of elements in the corresponding characteristic matrix;
  a weighting value adjusting unit configured to adjust the weighting value of each of the normalized characteristic matrixes based on the integrity rates while ensuring a sum of all of the adjusted weighting values is equal to 1; and
  a weighting fusion unit configured to perform weighting fusion on all of the normalized characteristic matrixes based on the adjusted weighting values, to obtain the fused characteristic matrix.

10. The device according to claim 9, further comprising:
 a business allowing module configured to allow the to-be-identified user to handle business on a currently-logged account in a case that the identity identification result obtained by the identifying module indicates that the to-be-identified user passes identity identification; and
 an alarm module configured to return to the step of collecting at least two types of biological characteristic identity information of the to-be-identified user and raise an alarm to the logged account, in a case that the identity identification result obtained by the identifying module indicates that the to-be-identified user fails to pass the identity identification.

11. The device according to claim 10, further comprising a reserving module configured to reserve the standard matrix before the device is used for the first time, wherein the reserving module comprises:
- an information collecting unit configured to collect at least two types of biological characteristic identity information of an account holder;
- a characteristic extracting unit configured to perform characteristic extraction on each type of the at least two types of collected biological characteristic identity information of the account holder, to obtain sets of characteristic information of the account holder, wherein there is a one-to-one correspondence between the sets of characteristic information of the account holder and the at least two types of biological characteristic identify information of the account holder;
- a characteristic matrix establishing unit configured to establish characteristic matrixes of the account holder based on the sets of characteristic information of the account holder, wherein there is another one-to-one correspondence between the sets of characteristic information of the account holder and the characteristic matrixes of the account holder;
- a normalizing unit configured to perform the normalization processing on each of the characteristic matrixes of the account holder;
- a matrix fusing unit configured to perform the dynamic weighting fusion on all of the normalized characteristic matrixes of the account holder, to obtain a fused characteristic matrix corresponding to the account holder; and
- a storage unit configured to store the fused characteristic matrix corresponding to the account holder in a database as the standard matrix.

12. The device according to claim 9, further comprising a reserving module configured to reserve the standard matrix before the device is used for the first time, wherein the reserving module comprises:
- an information collecting unit configured to collect at least two types of biological characteristic identity information of an account holder;
- a characteristic extracting unit configured to perform characteristic extraction on each type of the at least two types of collected biological characteristic identity information of the account holder, to obtain sets of characteristic information of the account holder, wherein there is a one-to-one correspondence between the sets of characteristic information of the account holder and the at least two types of biological characteristic identify information of the account holder;
- a characteristic matrix establishing unit configured to establish characteristic matrixes of the account holder based on the sets of characteristic information of the account holder, wherein there is another one-to-one correspondence between the sets of characteristic information of the account holder and the characteristic matrixes of the account holder;
- a normalizing unit configured to perform the normalization processing on each of the characteristic matrixes of the account holder;
- a matrix fusing unit configured to perform the dynamic weighting fusion on all of the normalized characteristic matrixes of the account holder, to obtain a fused characteristic matrix corresponding to the account holder; and
- a storage unit configured to store the fused characteristic matrix corresponding to the account holder in a database as the standard matrix.

* * * * *